Figure 1:
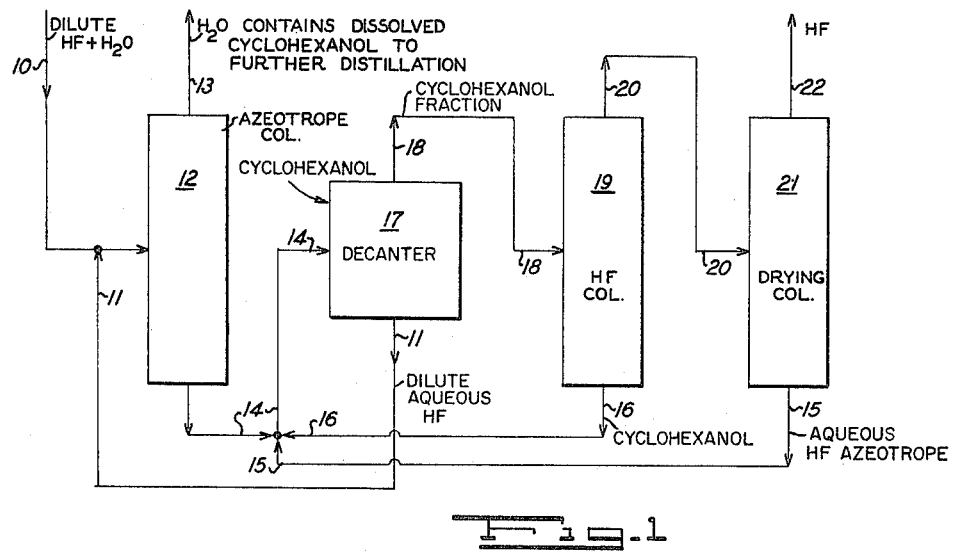

Sept. 6, 1966     S. N. FOX ET AL     3,271,273
DISTILLATION PROCESS FOR RECOVERING
ANHYDROUS HYDROGEN FLUORIDE
Filed Feb. 13, 1963

INVENTORS
SHERWOOD N. FOX
MARTIN B. SHERWIN

BY William C. Long
ATTORNEY

United States Patent Office 3,271,273
Patented Sept. 6, 1966

3,271,273
DISTILLATION PROCESS FOR RECOVERING ANHYDROUS HYDROGEN FLUORIDE
Sherwood N. Fox, Stamford, Conn., and Martin B. Sherwin, Jackson Heights, N.Y., assignors to Halcon International, Inc., a corporation of Delaware
Filed Feb. 13, 1963, Ser. No. 258,284
10 Claims. (Cl. 203—12)

This invention relates to processes for recovering hydrogen fluoride from a mixture thereof with water, e.g., such a mixture as the azeotropic composition (about 38% of the fluoride at 1 atm.) by contacting the mixture with an oxygenated organic material which is substantially insoluble in the aqueous mixture, whereby two phases are formed, each of which contains some of the hydrogen fluoride, separating the phases, and recovering hydrogen fluoride from the organic liquid. More particularly, it relates to such a process wherein the organic material is cyclohexanol and it is recycled after stripping hydrogen fluoride therefrom, the aqueous phase being distilled to remove water and bring the mixture up to an azeotropic boiling concentration of hydrogen fluoride, following which the azeotropic mixture is submitted to extraction by the cyclohexanol.

Hydrofluoric acid is a commercially important material and finds use in many chemical processes, some of which produce an azeotropic boiling mixture thereof with water which is difficult and costly to separate or break into its components. In particular, corrosion is often a problem in breaking this azeotrope. The art is confronted by the problem of providing convenient and economical methods for obtaining substantially anhydrous hydrogen fluoride from such mixtures.

The discoveries associated with the invention and relating to the solution of the above problems, and the objects achieved in accordance with the invention as set forth herein include the provision of:

A process for recovering anhydrous hydrogen fluoride which comprises forming a two-phase mixture thereof with water and a water immiscible oxygenated organic liquid, each phase containing some of the hydrogen fluoride, recovering hydrogen fluoride from the organic liquid phase, removing water from the aqueous phase to form an aqueous hydrofluoric acid azeotrope and returning the latter to the step of forming the separate liquid phases;

Such a process wherein the dilute aqueous hydrofluoric acid is concentrated to form aqueous hydrofluoric acid azeotrope and this is contacted with the organic liquid to form the two phases, the liquid remaining after separation of hydrogen fluoride from the organic phase being returned to the contacting step;

Such a process wherein the hydrogen fluoride separated from the organic liquid phase contains some water and this is distilled to remove hydrogen fluoride as overhead and leave a bottoms fraction which is aqueous hydrogen fluoride azeotrope and this is recycled to the contacting step;

Such a process wherein the dilute aqueous phase is separated and concentrated to produce aqueous hydrofluoric acid azeotrope and this is returned to the contacting step;

Such a process wherein the organic liquid is cyclohexanol;

Such a process wherein the azeotrope is formed at 1 atm., and the separated cyclohexanol phase contains up to about 20% of hydrogen fluoride and up to about 15% of water;

Such a process wherein the separated aqueous phase contains up to about 37% hydrogen fluoride and up to about 3% of cyclohexanol at about 25° C., and it is concentrated up to about 38% hydrogen fluoride and then recycled to the contacting step;

Such a process wherein a cyclohexanol mixture containing water, hydrogen fluoride, and rearranged peroxidized cyclohexanol is stripped to remove hydrogen fluoride and then extracted with water to remove hydrogen fluoride, leaving the bottoms fraction which is low in hydrogen fluoride and contains cyclohexanol together with the rearranged material, the extract being distilled;

Such a process wherein aqueous hydrofluoric acid is separated from the extract, following which the acid is distilled overhead, leaving hydrofluoric acid azeotrope which is recycled to the contacting step;

Such a process wherein the bottoms resulting from removal of hydrogen fluoride from the extract is contacted with cyclohexanol and the resulting two phases are separated;

Such a process wherein the aqueous phase is distilled to remove water as overhead and leave a bottoms fraction which is aqueous hydrofluoric acid azeotrope and this is recycled to the contacting step;

Such a process wherein the cyclohexanol phase is distilled to remove hydrogen fluoride as overhead and leave a bottoms fraction which is cyclohexanol and this is recycled to the contacting step;

And other objects which will be apparent as details or embodiments of the invention are set forth hereinafter.

Figure 2:
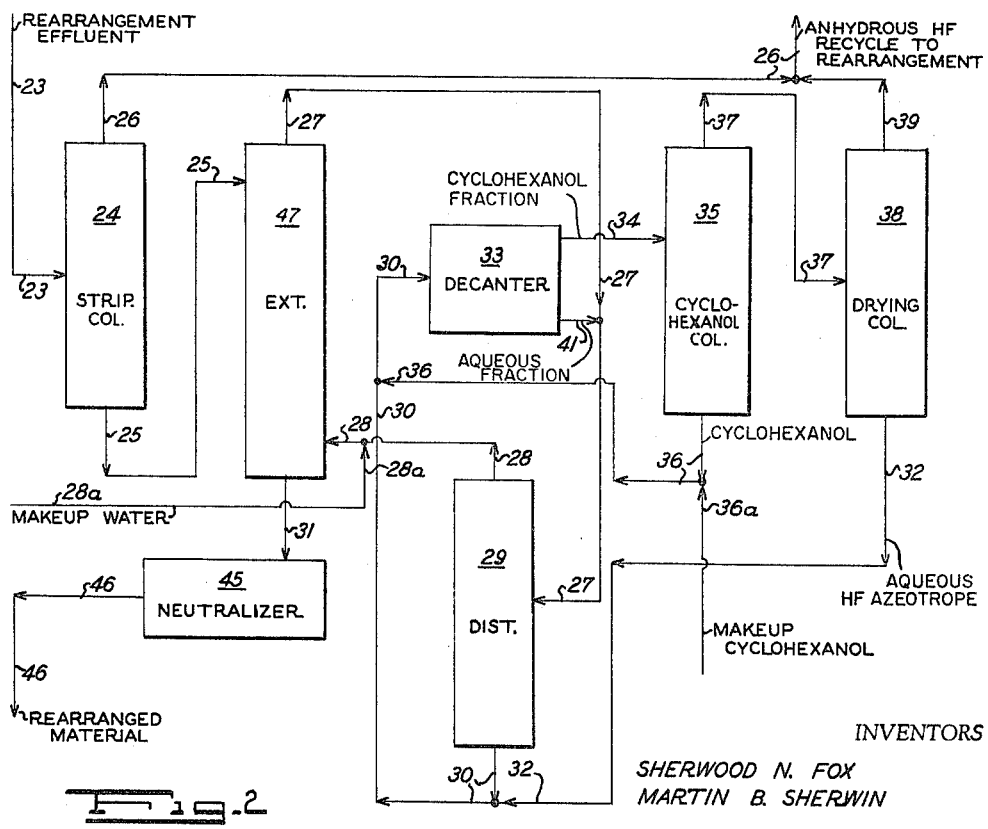

In the accompanying drawing, FIGURES 1 and 2 are schematic flow diagrams of embodiments of the invention.

In order to indicate still more fully the nature of the present invention, the following examples of typical procedures are set forth in which parts and percents mean parts and percents by weights, respectively, unless otherwise indicated, it being understood that these examples are presented as illustrative only and they are not intended to limit the scope of the invention.

*Example 1*

Referring to FIGURE 1, a dilute aqueous hydrofluoric acid mixture is passed via line 10 into azeotrope distillation column 12, and an overhead containing water is taken out via line 13, which may be further distilled to recover any cyclohexanol therein (by means not shown). Recycled dilute aqueous hydrofluoric acid is passed via line 11 into column 12 also. The bottoms from column 12 is approximately the aqueous hydrofluoric acid azeotrope and it is passed via line 14 to liquid-liquid contactor/separator 17 together with recycled cyclohexanol from line 16. Two separate liquid phases are formed. The cyclohexanol phase is passed via line 18 to hydrogen fluoride column 19, where a hydrogen fluoride stream is taken overhead and passed via line 20 to optional final drying column 21, wherein essentially dry hydrogen flouride is separated as an overhead and it is removed via line 22. The aqueous phase (which is a dilute hydrogen fluoride solution) is passed from contactor 17 via line 11 back to azeotrope distillation column 12. The bottoms from column 19 is predominantly cyclohexanol, and it is recycled to the liquid contactor 17 via line 16. The bottoms fraction from column 21 is essentially an aqueous hydrofluoric acid azeotrope, and it is recycled to the contactor 17 via lines 15 and 14.

The dilute initial aqueous mixture is concentrated in column 12 by removing water therefrom. Any cyclohexanol in the overhead may be recovered by decantation and, if necessary, by further distillation of the water stream in known manner.

The distillation in column 12 is carried out at 1 atm. pressure and yields an azeotrope containing about 38% hydrogen fluoride.

This azeotrope bottoms fraction is sent to the contacting/separating vessel 17 wherein cyclohexanol recycle amounting to about 5.6 times the weight of hydrogen fluoride in the azeotrope which is fed. Two liquid phases are formed and the hydrogen fluoride distributes itself between these phases. The cyclohexanol phase contains about 75% cyclohexanol, 12% hydrogen fluoride and 13% water. It is processed in column 19 wherein hydrogen fluoride is distilled overhead, the cyclohexanol containing bottoms being returned to the vessel 17 to again serve as an extracting agent. The operation can be run so as to carry most of the water with the bottoms. However, if a substantial amount of water is carried with the hydrogen fluoride overhead it may be further processed in drying column 21 to take off anhydrous hydrogen fluoride as overhead and a bottoms fraction which is the aqueous hydrofluoric acid azeotrope, and this is recycled to the extraction step. The water phase from the extractor contains about 74% water, 23% hydrogen fluoride and 3% cyclohexanol. This is recycled to column 12 where water is removed overhead.

In this way convenient and economical recovery of the hydrogen fluoride in essentially anhydrous form is achieved. It is important to regulate the hydrogen fluoride distillation in column 19 to avoid or minimize decomposition or chemical change of the cyclohexanol.

Any convenient contacting means may be used for the two liquid phases, e.g., a simple mixer or a multi-stage reaction column. Other methods of forming the hydrogen fluoride-water-cyclohexanol mixture or like mixtures may be used; e.g., vapors containing these materials may be mixed and condensed to form the layers, which are then processed as described herein, or a liquid cyclohexanol stream may be contacted with an aqueous hydrogen fluoride vapor.

Example 2

A reaction mixture containing cyclohexanol and hydrogen fluoride is produced by rearranging peroxidized cyclohexanol in cyclohexanol solution containing about 10% peroxy materials in the presence of hydrogen fluoride. This process is set forth and claimed in pending application Serial Number 183,031, filed March 28, 1962, now U.S. Patent 3,234,212.

Referring to FIGURE 2 the rearrangement reaction effluent may optionally be passed via line 23 into column 24 and a portion of the hydrogen fluoride is removed therefrom in relatively dry form as an overhead via line 26. The bottoms fraction or the effluent is passed via line 25 to the extractor column 26 and a bottoms fraction (low in acid) is passed via line 31 to a neutralization vessel 45 where it is neutralized with an aqueous caustic mixture and is passed via line 46 to further processing to recover the cyclohexanol as well as other materials therein. The recovered cyclohexanol may be returned to the initial reaction step.

The top fraction from column 47 is passed via line 27 to column 29 where an aqueous fraction is separated overhead and passed via line 28 to vessel 47. Water is added via line 28a. The bottoms fraction (azeotrope) is passed via line 30 to decanter 33. The upper cyclohexanol phase is passed via line 34 to cyclohexanol column 35 wherein hydrogen fluoride is taken off as an overhead and passed via line 37 to drying column 38 wherein anhydrous hydrogen fluoride is taken off as an overhead via lines 39 and 26. The bottoms from column 35 is passed via lines 36 and 30 to decanter 33. The aqueous hydrofluoric acid azeotrope bottoms fraction from column 38 is passed via lines 32 and 30 to the decanter 33. The aqueous phase is passed from decanter 33 via lines 41 and 27 to column 29 wherein water is removed as an overhead. The bottoms fraction from 29 is aqueous hydrofluoric acid azeotrope and it is passed via line 30 to decanter 33 for further processing. Makeup cyclohexanol is added via line 36a.

The hydrogen fluoride overhead is further distilled to recover anhydrous hydrogen fluoride which may be recycled to the arrangement reaction step. The bottoms fraction is hydrogen fluoride azeotrope which is recycled to the decanter for further processing.

From the economic viewpoint this is an advantageous operation especially for producing such rearrangement derivatives in an economical manner. A unique feature is use of one of the materials in the systems as an extraction solvent.

The process is also economical if stripper 24 is bypassed. In such a case, the composition in line 46 is about 73% cyclohexanol, about 10.5% water, and the remainder reaction product. The hydrofluoric acid content is very low. The water extract in line 27 contains about 25% hydrogen fluoride, about 72% water and about 3% cyclohexanol.

In addition to cyclohexanol other oxygenated organic materials may be used in place of cyclohexanol as media. These include methyl isobutyl ketone, methyl isopropyl ketone, n-butanol, n-hexanol, and the like.

In view of the foregoing disclosures, variations and modifications thereof will be apparent to one skilled in the art, and it is intended to include within the invention all such variations and modifications except as do not come within the scope of the appended claims.

What is claimed is:

1. A process for recovering anhydrous hydrogen fluoride by distillation which comprises forming a two phase mixture thereof with water and a water immiscible oxygenated organic liquid selected from the group consisting of n-butanol, methyl isopropyl ketone, methyl isobutyl ketone, n-hexanol, or cyclohexanol, each phase containing some of the hydrogen fluoride, recovering anhydrous hydrogen fluoride as overhead by distillation from the organic liquid phase, removing water from the aqueous phase by distillation to form an aqueous hydrofluoric acid azeotrope as bottoms and returning the latter to the step of forming the separate liquid phases.

2. A process of claim 1 wherein the dilute aqueous hydrofluoric acid is concentrated to form aqueous hydrofluoric acid azeotrope and this is contacted with the organic liquid to form the two phases, the liquid remaining after separation of hydrogen fluoride from the organic phase being returned to the contacting step.

3. A process of claim 2 wherein the hydrogen fluoride separated from the organic liquid phase contains some water and the separated hydrogen fluoride is distilled to remove hydrogen fluoride as overhead and leave a bottoms fraction which is aqueous hydrogen fluoride azeotrope and this is recycled to the contacting step.

4. A process of claim 2 wherein the organic liquid is cyclohexanol and the separated cyclohexanol phase contains hydrogen fluoride and water, said hydrogen fluoride being present in an amount up to about 20% by weight, said water being present in an amount up to about 15% by weight.

5. A process of claim 4 wherein the separated aqueous phase contains hydrogen fluoride and cyclohexanol, the hydrogen fluoride being present in an amount up to about 37% and the cyclohexanol being present in an amount up to about 3% by weight at about 25° C., and it is concentrated up to about 38% hydrogen fluoride and then recycled to the contacting step.

6. A process of claim 4 wherein cyclohexanol mixture containing water, hydrogen fluoride, and rearranged peroxidized cyclohexanol is stripped to remove anhydrous hydrogen fluoride and then extracted with water to remove hydrogen fluoride leaving the bottoms fraction which is low in hydrogen fluoride and contains cyclohexanol together with the rearranged material, the extract being distilled.

7. A process of claim 6 wherein aqueous hydrofluoric acid is separated from the extract, following which the acid is distilled overhead, leaving hydrofluoric acid azeotrope which is recycled to the contacting step.

8. A process of claim 7 wherein the bottoms resulting from removal of hydrogen fluoride from the extract is contacted with cyclohexanol and the resulting two phases are separated.

9. A process of claim 8 wherein the aqueous phase is distilled to remove water as overhead and leave a bottoms fraction which is aqueous hydrofluoric acid azeotrope and this is recycled to the contacting step.

10. A process of claim 9 wherein the cyclohexanol phase is distilled to remove hydrogen fluoride as overhead and leave a bottoms fraction which is cyclohexanol and this is recycled to the contacting step.

References Cited by the Examiner

UNITED STATES PATENTS

| | | | |
|---|---|---|---|
| 2,371,341 | 3/1945 | Matuszak | 23—153 X |
| 2,414,646 | 1/1947 | Hepp | 202—42 |
| 2,425,752 | 8/1947 | McKenna et al. | 202—60 X |
| 2,445,217 | 7/1948 | Frey | 23—153 X |
| 2,498,789 | 2/1950 | Carnell | 23—153 X |
| 2,661,319 | 12/1953 | Shire | 202—39.5 X |

NORMAN YUDKOFF, *Primary Examiner.*

F. E. DRUMMOND, *Assistant Examiner.*